United States Patent
Kugel et al.

(10) Patent No.: US 6,499,347 B1
(45) Date of Patent: Dec. 31, 2002

(54) METHOD FOR DETERMINING A COMPONENT-SPECIFIC WOBBLE COMPONENT WITHIN A MULTI-PART ASSEMBLY OF PARTS, AND MASTER PART FOR CARRYING OUT THE METHOD

(75) Inventors: Uwe Kugel, Renningen (DE); Helmut Reichelt, Denkendorf (DE); Ludger Willenbrink, Remseck (DE)

(73) Assignee: DaimlerChysler AG, Stuttgart (DE)

( * ) Notice: Subject to any disclaimer, the term of this patent is extended or adjusted under 35 U.S.C. 154(b) by 0 days.

(21) Appl. No.: 09/701,093
(22) PCT Filed: Mar. 2, 1999
(86) PCT No.: PCT/EP99/01351
§ 371 (c)(1), (2), (4) Date: Apr. 4, 2001
(87) PCT Pub. No.: WO99/50613
PCT Pub. Date: Oct. 7, 1999

(30) Foreign Application Priority Data

Mar. 27, 1998 (DE) .......................................... 198 13 675

(51) Int. Cl.$^7$ ........................... G01M 19/00; G01B 5/00
(52) U.S. Cl. ........................... 73/460; 73/117; 188/73.2; 33/336
(58) Field of Search ........................... 73/460, 117, 123, 73/126; 188/73.2, 73.1; 33/203.18, 203.19, 203.2, 203.21, 203.12, 203.13, 286, 288, 336, 337

(56) References Cited

U.S. PATENT DOCUMENTS

| 4,180,915 A | * | 1/1980 | Lill et al. ................. 33/203.19 |
| 5,029,395 A | * | 7/1991 | Brauer et al. ............. 33/203.18 |
| 5,090,235 A | * | 2/1992 | Hirano et al. ................. 73/117 |
| 5,562,193 A |   | 10/1996 | Yamaguchi ............. 129/110 R |

FOREIGN PATENT DOCUMENTS

| DE | 42 25 195 A1 | 7/1992 |
| GB | 2 159 276 A | 5/1985 |
| JP | 01285453 | 11/1989 |

* cited by examiner

Primary Examiner—Helen Kwok
(74) Attorney, Agent, or Firm—Kenyon & Kenyon

(57) ABSTRACT

In the case of vehicle wheels the single-phase wobble may not exceed a certain maximum value if the vehicle is to satisfy certain demands of comfort. However, in this case it is of little use to measure the wobble of the vehicle brake disc and that of the vehicle hub carrying the said brake disc individually, because this is unable to give any statement concerning the wobble of the entire constructional unit.

With the aid of the method according to the invention, the wobble component, due to a wheel hub, of the constructional unit mentioned can be ascertained exactly if the precise data of the very precisely produced master brake disc, which is used in the measurement instead of the vehicle brake disc, is known.

The method can only be carried out successfully using the master brake disc mentioned.

15 Claims, 1 Drawing Sheet

METHOD FOR DETERMINING A COMPONENT-SPECIFIC WOBBLE COMPONENT WITHIN A MULTI-PART ASSEMBLY OF PARTS, AND MASTER PART FOR CARRYING OUT THE METHOD

The invention relates to a method for determining a wobble component due to a wheel hub of a vehicle and to a brake disc for carrying out this method.

On account of the increased demands for comfort, wheel brake discs of motor vehicles may only have a minimum wobble; a maximum of approximately 40 µm at a diameter of 200 mm.

Greater wobbling of the brake disc leads to so-called brushing wear of the brake surface at the circumferential points of the greatest axial elevation of the brake disc during driving. At these circumferential points, the brake disc then has a changed surface texture in comparison with the other circumferential points, different frictional behaviour and a slight axial decrease in thickness. When actuated, this results in so-called brake juddering, i.e. a circumferentially synchronous, periodic fluctuation of the braking action.

In this connection, this depends less on the wobble of the isolated individual part than on that of the overall assembly comprising wheel bearings, hub inner contour, hub flange and brake disc. Due to the manufacturing process, each of these parts or contours is inherently provided with an unavoidable shape and measurement inaccuracy, these inaccuracies overriding one another in the assembly. The individual inaccuracies are dispersed statistically around an average value. The shape deviations are composed diversely of surface roughness, undulatory nature of the component and wobble. When a total wobble of x µm is permitted at the assembly of the axle head, consisting overall of n parts together with the brake, theoretically, for each. individual part, a wobble of x/n maximum should be permitted. It ensues that the maximum permitted wobble of the brake disc applies to its outer circumference; a correspondingly smaller wobble, in accordance with the diameter ratio of brake disc to hub flange diameter, has to be prescribed in the case of a hub flange having a substantially smaller external diameter.

In this connection, wobble means an axial, sinoid positional deviation (single-phase wobble) which reproduces itself periodically during a single revolution of a component. The problem existing here is composed of a number of factors:

For one thing, the dimensional and shape deviations which are not of interest here, such as surface roughness and undulatory nature of the component, greatly override, with regard to their tolerable extent, the wobble which is actually of interest, with the result that the parameter which is of interest here cannot be isolated by measuring technology from a scanning record. The tolerable surface roughnesses and undulatory nature of the component are greater in their extent than the wobble which can be tolerated for an individual part.

Also, during the assembly, the parts become distorted, because of the joining force, in an extent of at least the same order of magnitude as the maximum permissible individual wobble for each component or component contour, i.e. even the component warpage due to assembly greatly overrides the wobble which is actually of interest.

Also, should it actually be possible—for example, because of certain filter treatments—to isolate, using measurement technology, from a scanning record which is heavily overriden by signals which are not of interest, the single-phase wobble which is of interest here, it is nevertheless not possible to determine from this that component of the wobble which is attributed to the wheel hub.

Also, the factor in avoiding the brake juddering is for the wobble of the overall constructional unit to be as small as possible. In spite of keeping the wobble at the individual parts appropriately low, it may happen that during the assembly of the individual parts, an overall wobble is produced which is higher than the sum of the individual wobbling. Also the assembly of the individual parts itself therefore likewise generates a further wobble component which is dispersive in its effect.

Also, in order to be able to ensure the replaceability of the brake disc on its own—as a wearing part—a constructional unit formed from a wheel hub and brake disc would not be able to be machined in respect of a slight wobble in the assembled state. In that case, when the worn brake disc is used, the wheel hub would also have to be renewed, which is to be avoided.

Also, in order to be able to draw nearer to a solution to the problem, there have to be ascertained from the overall wobble arising after the assembly of the individual parts, wobble components which can be unambiguously assigned to a specific component, for example the wheel hub. Only if the isolated wobble component of the wheel hub can be ascertained within the assembly unit using measuring technology can methods be sought as to how this wobble component can be reduced using manufacturing technology.

Measurement of the wobble is not new and is known, for example, from GB 2 159 276 A. However, this publication is concerned merely with the measuring of a brake disc, so that the specimens which lie outside the tolerance limits can be ejected. The determination of a wobble component due to the wheel hub of a vehicle wheel within a multi-part overall assembly is not provided there.

It has been disclosed by JP 1-28 5453 A to individually measure the wobble of a disc rotor and of an axle stub and then, on the basis of the measurements, to, undertake a rotational alignment of the two elements with the most favourable values (-so-called matching). However, this also has nothing to do with the problem addressed above.

DE 42 25 195 A1 discloses a method for measuring radial run-out and/or axial run-out deviations of a rotor, in which the rotor, which is held in a testing machine by means of a play-compensating clamping holder, is rotated while the rotation of the rotor is scanned in the region of its circumferential and/or side surfaces by contacting or contactless sensors and a radial run-out and/or axial run-out diagram is produced therefrom, two radial run-out or axial run-out diagrams, which are rotated through 180° with respect to one another with regard to the clamping holder, being combined with one another and geometrical measurement errors, resulting from the clamping holder, in the two diagrams being compensated for in the radial run-out and axial run-out diagram obtained by the combination.

BRIEF SUMMARY

The object of the present invention is to provide a measurement method for determining a wobble component due to the wheel hub of a vehicle wheel within a multi-part overall assembly comprising wheel bearings, hub inner contour, hub flange and brake disc. The overall assembly can therefore be measured using a known measurement method, and this measurement should then enable the wobble component due to the wheel hub to be easily ascertained. This measurement method is suitable in practice in automotive engineering. Namely, the abovementioned brake juddering originates, as mentioned, not merely from the brake disc, but also from the overall assembly, for which reason there is little point in measuring and considering the brake disc in isolation. In addition, in the case of this overall assembly generally only the brake disc is the wearing part if the substantially longer service life of the wheel bearings is left out of the equation.

Accordingly, a quite essential point of this invention is the production and use of a master brake disc which is initially fastened, for measurement purposes, to the hub instead of the brake disc actually used in the vehicle. In this case, not only are all of its values, such as surface roughness, undulatory nature, evenness and wobble, as considered over the entire angular range of 360°, known, but moreover also a precise allocation of the "errors", with regard to their phase position on this master brake disc is known. If, using this master brake disc, the measurement values of interest of the entire assembly are determined, the known values of the master brake disc can be subtracted from the determined values at a correct phase allocation, and a differential value is then obtained which can be expressed and which constitutes the wobble of the wheel hub. Of importance here is the design of the master brake disc, in particular the master brake disc may only have noticeably smaller errors than the values which are to be measured of the hub flange and the tolerance values of this components.

The advantages of the method according to the invention and of the associated master brake disc are the simple measurement means allowing the use of a wobble-measuring machine and measurement scanning-profile device. The measurement-assisting means used, namely the master brake disc, is, as the drawing shows, in conformity with the brake disc of the vehicle, a very simple element which can therefore also be produced very precisely. Simple measurement rules are sufficient and the measurement result can be reproduced by measuring technology. Finally, a clear assignment, by measuring technology, of the result to an isolated component is also achieved in the sought-after manner.

The drawings illustrate exemplary embodiments of the invention.

DESCRIPTION OF EMBODIMENTS

Figure 1:
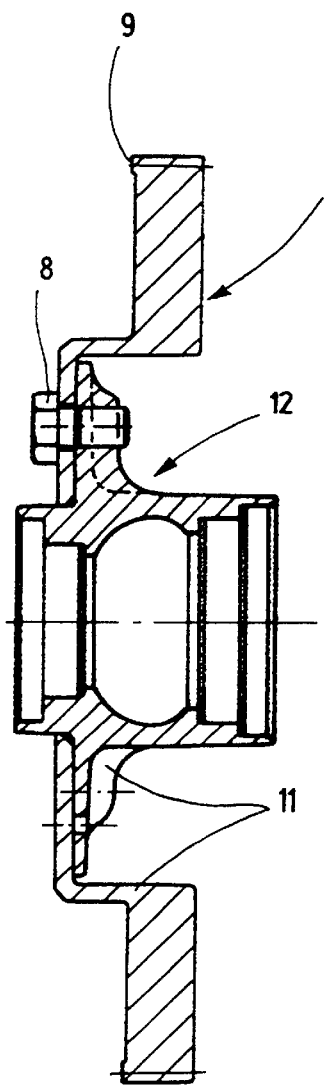
FIG. 1 shows a longitudinal central section through a unit comprising brake hub and master brake disc.
Figure 2:
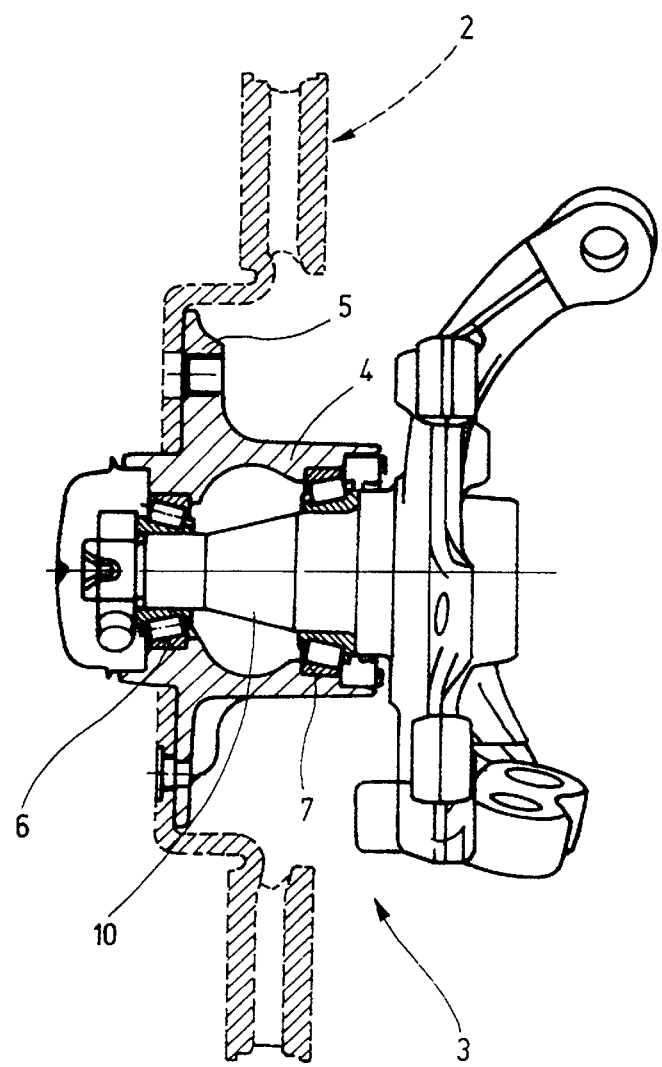
FIG. 2 shows an analogous illustration of the entire assembly, but with the actually used brake disc instead of the master brake disc.

As a comparison of the two figures shows, the master brake disc 1 has approximately the same size and shape as the vehicle brake disc 2. It is also provided with the same drilled holes, so that it can be connected fixedly to the hub or the hub flange in the same manner as the vehicle brake disc. The entire assembly 3 essentially comprises the hub inner contour 4, the hub flange 5, the two wheel bearings 6 and 7 and the vehicle brake disc mentioned. The remaining parts, for example the axle journal, are of secondary importance here.

As stated, instead of the vehicle brake disc 2 the master brake disc 1 is connected fixedly to the hub flange 5 and is held together with the aid of screws 8 which correspond to those with which the brake disc 2 is secured in the vehicle. These screws 8 are tightened using defined tightening torques.

An inherently closed measurement-scanning surface 9 which is aligned perpendicularly to the axis is incorporated on the outer circumference of the master brake disc 1. In addition, there is, in a manner not show, a phase zero point on a corresponding line on the master brake disc. This circumferential point is precisely fixed and known with regard to its measurement values.

The constructional unit 11 comprising the vehicle hub 12 and the master brake disc 1 is inserted in a centered manner into a wobble-measuring device where it is mounted rotatably, so that the measurement can be undertaken in the circumferential direction.

Although the invention has been described in detail with reference to certain preferred embodiments and specific examples, variations and modification exist within the scope and spirit of the invention as described and as defined in the following claims.

What is claimed is:

1. A method for determining, using measuring technology, a wobble component due to a wheel hub of a vehicle wheel within a multi-part overall assembly comprising wheel bearings, hub inner contour, hub flange and brake disc, characterized by the entirety of the following features:

a master brake disc, which is known with regard to wobble and other measurable values relevant for determining wobble, is screwed to the flange of the wheel hub using defined tightening torques;

a constructional unit comprising the master brake disc and the wheel hub to be measured is held in a centered and rotatable manner in a wobble-measuring device;

performing a measurement at an inherently closed measurement-scanning surface which is aligned perpendicularly to an axis and a wobble of which is known in terms of extent and phase position, the measurement being started at a fixed and known circumferential position; an overall wobble of the constructional unit is kept in terms of extent and phase position as a measurement record; and for the purpose of ascertaining an isolated wobble of the hub flange, the wobble of the master brake disk, which is known in terms of extent and phase position, is subtracted, at a mutually correct phase allocation, from the measurement record so as to form a differential record.

2. The method according to claim 1, wherein the measurement of the wobble is carried out in accordance with a scanning-profile method.

3. A brake disc for carrying out the method according to claim 2, wherein the design of the brake disc as a master brake disc, whose external contours are at least approximately identical in shape to the brake disc of the overall assembly comprising wheel bearings, hub inner contour, hub flange and vehicle brake disc, and which has, on an outer circumference, an inherently closed measurement-scanning surface which is aligned perpendicularly to the axis and with regard to surface roughness, undulatory nature, evenness and wobble, has noticeably smaller errors than wobble which is to be measured of the hub flange, the phase position of wobble being detected using measuring technology.

4. A method for determining a wobble of a wheel hub of a vehicle wheel, the vehicle wheel being part of a multi-part assembly that includes a wheel hub, a wheel hub flange and a master disc brake, the vehicle wheel defining a central axis, comprising the steps of:

attaching the master brake disc to the wheel hub flange to form a constructional unit, the master disc brake having a master disc brake wobble known in terms of extent and phase position;

centrally and rotationally holding the constructional unit in a wobble-measuring device;

using the wobble-measuring device, determining an overall wobble, in terms of extent and phase position, of the constructional unit by performing a wobble measurement at an inherently closed measurement-scanning surface, the wobble measurement being started at a predetermined circumferential position, the surface being aligned substantially perpendicularly to the central axis of the vehicle wheel; and determining the wobble of the wheel hub by subtracting, at each point of the phase position, the extent of the master disc brake wobble from the extent of the overall wobble.

5. The method of claim 4, wherein the attaching step includes the substep of screwing the master brake disc to the wheel hub flange.

6. The method of claim 5, wherein screwing step includes the substep of tightening the screws to a predetermined torque value.

7. The method of claim 4, further comprising the step of storing the overall wobble, in terms of extent and phase position, as a measurement record.

8. The method of claim 7, wherein the subtracting step includes the substep of subtracting at each point of the phase position the extent of the master brake disc wobble from the measurement record.

9. The method of claim 8, further comprising the step of forming a differential record of the wobble of the wheel hub after the subtracting step.

10. An apparatus of determining a wobble of a wheel hub of a vehicle wheel, comprising:

a vehicle wheel that includes a central axis, the vehicle wheel being part of a multi-part assembly that includes a wheel hub, a wheel hub flange and a master disc brake, the master brake disc attached to the wheel hub flange to form a constructional unit, the master disc brake having a master disc brake wobble that is known in terms of extent and phase position, the constructional unit including an inherently closed measurement-scanning surface aligned substantially perpendicularly to the central axis of the vehicle wheel; and a wobble-measuring device, the constructional unit centrally and rotationally maintained in the wobble-measuring device, the wobble-measuring device configured to perform a wobble measurement of a surface to obtain an overall wobble measurement, in terms of extent and phase position, of the constructional unit, the wobble of the wheel hub corresponding to a difference, at each point of the phase position, between an extent of the master disc brake wobble and an extent of the overall wobble.

11. The apparatus of claim 10, wherein the master brake disc is screwed to the wheel hub flange.

12. The apparatus of claim 11, wherein the master brake disc is screwed to the wheel hub flange to a predetermined torque value.

13. The apparatus of claim 12, wherein the apparatus is configured to store the overall wobble, in terms of extent and phase position, as a measurement record.

14. The apparatus of claim 13, wherein the apparatus is configured to subtract, at each point of the phase position, the extent of the master brake disc wobble from the measurement record to obtain the wobble of the wheel hub.

15. The apparatus of claim 14, wherein the apparatus is configured to form a differential record of the wobble of the wheel hub.

* * * * *